United States Patent
Kashi et al.

(10) Patent No.: US 9,704,405 B2
(45) Date of Patent: Jul. 11, 2017

(54) AIRCRAFT DISPLAY SYSTEMS AND METHODS FOR PROVIDING AN AIRCRAFT DISPLAY FOR USE WITH AIRPORT DEPARTURE AND ARRIVAL PROCEDURES

(71) Applicant: HONEYWELL INTERNATIONAL INC., Morristown, NJ (US)

(72) Inventors: Rajanikanth Nagaraj Kashi, Karnataka (IN); Divakara Rao Vadada, Karnataka (IN); Cercuncesao Fernandes, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 92 days.

(21) Appl. No.: 14/302,649

(22) Filed: Jun. 12, 2014

(65) Prior Publication Data
US 2015/0364044 A1 Dec. 17, 2015

(51) Int. Cl.
*G08G 5/00* (2006.01)
*G08G 5/02* (2006.01)
(Continued)

(52) U.S. Cl.
CPC ......... *G08G 5/0021* (2013.01); *G01C 23/005* (2013.01); *G08G 5/0013* (2013.01);
(Continued)

(58) Field of Classification Search
CPC .... G01C 23/00; G08G 5/0021; G08G 5/0013; G08G 5/025; G02B 2027/014
See application file for complete search history.

(56) References Cited

U.S. PATENT DOCUMENTS 3,574,283 A * 4/1971 Albers .................. G01S 1/02
340/980
6,633,810 B1 10/2003 Qureshi et al.
(Continued)

OTHER PUBLICATIONS http://www.flyingmag.com/technique/tip-week/following-departure-procedures Following Departure Procedures Stephen Pope, May 4, 2011 Note paragraphs 2-3 relating to published departure procedures and how pilots should review them every time before takeoff.*

(Continued)

*Primary Examiner* — Adam Tissot
*Assistant Examiner* — Tommy Worden
(74) *Attorney, Agent, or Firm* — Lorenz & Kopf, LLP

(57) ABSTRACT

A method for generating a flight display in an aircraft includes the steps of receiving an indication of an arrival or a departure procedure for the aircraft to follow, receiving an indication of a current position and altitude of the aircraft, and receiving a voice communication or information by digital data link regarding the arrival or departure procedure. The method further includes the steps of recognizing speech in the voice communication and transforming the speech to a restriction regarding the arrival or departure procedure and providing a flight display comprising a visual depiction of the arrival or departure procedure, the current position and altitude of the aircraft, and the restriction regarding the arrival or departure procedure. The method also provides improved situational awareness to pilots by providing appropriate alerts and indications in the context of these restrictions and the implications that these may have on the ownship with reference to the surrounding traffic and the emergent conditions.

14 Claims, 13 Drawing Sheets

(51) Int. Cl.
*G01C 23/00* (2006.01)
*G08G 5/04* (2006.01)

(52) U.S. Cl.
CPC ......... *G08G 5/0065* (2013.01); *G08G 5/0095* (2013.01); *G08G 5/025* (2013.01); *G08G 5/0078* (2013.01); *G08G 5/045* (2013.01)

(56) References Cited

U.S. PATENT DOCUMENTS

| | | | |
|---|---|---|---|
| 6,980,892 B1 | 12/2005 | Chen et al. | |
| 6,992,626 B2* | 1/2006 | Smith | G01S 13/781 342/454 |
| 7,126,534 B2 | 10/2006 | Smith et al. | |
| 7,177,731 B2* | 2/2007 | Sandell | G08G 5/0052 340/945 |
| 7,312,725 B2* | 12/2007 | Berson | G01C 23/00 340/461 |
| 7,568,662 B1* | 8/2009 | Conner | B64D 45/0015 244/118.5 |
| 7,693,621 B1 | 4/2010 | Chamas | |
| 7,783,393 B2* | 8/2010 | Tucker | G01C 23/00 340/945 |
| 8,014,907 B2 | 9/2011 | Coulmeau | |
| 8,032,267 B1* | 10/2011 | Simon | G01C 23/005 701/4 |
| 8,032,268 B2 | 10/2011 | Burgin et al. | |
| 8,145,367 B2* | 3/2012 | Khatwa | G08G 5/025 701/120 |
| 8,164,485 B2 | 4/2012 | Prinzel, III et al. | |
| 8,180,503 B2* | 5/2012 | Estabrook | B64C 13/18 340/945 |
| 8,285,427 B2 | 10/2012 | Rogers et al. | |
| 8,370,005 B2 | 2/2013 | Wilson et al. | |
| 8,478,461 B2* | 7/2013 | Khatwa | G08G 5/025 701/120 |
| 8,484,576 B2* | 7/2013 | Berson | G01D 7/08 715/781 |
| 8,566,015 B2 | 10/2013 | Brandao et al. | |
| 8,843,250 B2* | 9/2014 | Tucker | G01C 23/00 701/16 |
| 9,310,222 B1* | 4/2016 | Suiter | G01C 23/005 |
| 2003/0171939 A1* | 9/2003 | Yagesh | G06Q 10/06 705/325 |
| 2004/0210847 A1* | 10/2004 | Berson | G01D 7/08 715/788 |
| 2004/0222916 A1* | 11/2004 | Smith | G01S 13/781 342/29 |
| 2004/0246178 A1* | 12/2004 | Smith | G01S 13/781 342/454 |
| 2005/0007261 A1* | 1/2005 | Berson | G01C 23/00 340/945 |
| 2005/0049762 A1 | 3/2005 | Dwyer | |
| 2005/0200501 A1* | 9/2005 | Smith | G01S 5/06 340/963 |
| 2005/0203675 A1 | 9/2005 | Griffin, III et al. | |
| 2005/0203676 A1* | 9/2005 | Sandell | G08G 5/0052 701/3 |
| 2006/0004496 A1* | 1/2006 | Tucker | G01C 23/00 701/4 |
| 2006/0041345 A1* | 2/2006 | Metcalf | B64C 13/24 701/31.4 |
| 2007/0189328 A1* | 8/2007 | Judd | G10L 15/26 370/466 |
| 2008/0039988 A1* | 2/2008 | Estabrook | B64C 13/18 701/14 |
| 2008/0195309 A1* | 8/2008 | Prinzel, III | G01C 23/00 701/532 |
| 2009/0179114 A1* | 7/2009 | Conner | B64D 45/0015 244/189 |
| 2010/0023187 A1* | 1/2010 | Gannon | G01C 23/00 701/7 |
| 2010/0131126 A1 | 5/2010 | He et al. | |
| 2010/0305786 A1 | 12/2010 | Boorman | |
| 2010/0324812 A1* | 12/2010 | Sacle | G01C 21/00 701/467 |
| 2011/0106343 A1 | 5/2011 | Burgin et al. | |
| 2011/0118908 A1* | 5/2011 | Boorman | G08G 5/0021 701/14 |
| 2011/0184635 A1* | 7/2011 | Khatwa | G08G 5/065 701/120 |
| 2011/0246053 A1* | 10/2011 | Coulmeau | G08G 5/0013 701/120 |
| 2012/0035849 A1 | 2/2012 | Clark et al. | |
| 2012/0150423 A1* | 6/2012 | Khatwa | G08G 5/065 701/117 |
| 2013/0214941 A1 | 8/2013 | Rogers et al. | |
| 2013/0261848 A1 | 10/2013 | Khatwa et al. | |
| 2014/0097972 A1 | 4/2014 | Barraci et al. | |
| 2014/0122070 A1 | 5/2014 | Prus et al. | |

OTHER PUBLICATIONS

Campion-Smith, B.; Controller alerts Air Canada flight after it descends too low too soon in New York landing; [Retrieved from internet: http://www.thestar.com/news/canada/2012/12/14controller_alerts_air_canada_flight_after_it_descends_too_low_too_soon_in_new_york_landing.html] Jan. 13, 2014.

McElhatton, J. et al.; Crossing Restriction Altitude Deviations on SIDS and STARs [Retrieved from internet: http://asrs.arc.nasa.gov/publications/directline/dl10_xing.htm] Jan. 13, 2014.

NASA ASRS; B737-700 flight crew has an altitude deviation during the MAIER1 pt maier arrival to phx; 3700 Feet, Browse and Search NASA's Aviation Safety Reporting System; [Retrieved from internet: http://www.37000feet.com/report/712704/B737-700-flight-crew-has-an-altitude-deviation-during-the-MAIER1-pt-maier] Jan. 13, 2014.

Pilot Edge; Most common pilot deviations by ZLA pilots [Retrieved by internet: http:training.pilotedge.net/object/ZLA-common-pilot-errors.html] Jan. 13, 2014.

PANS-ATM Procedure Development; Level restrictions associated with standard instrument departures—background information [Retrieved from internet: http://www.caa.co.uk/docs/43/20120503LevelRestrictionsSIDBackgroundInformation.pdf] May 2012.

EP Extended Search Report for Application EP 15168776.1 Dated Feb. 1, 2016.

* cited by examiner

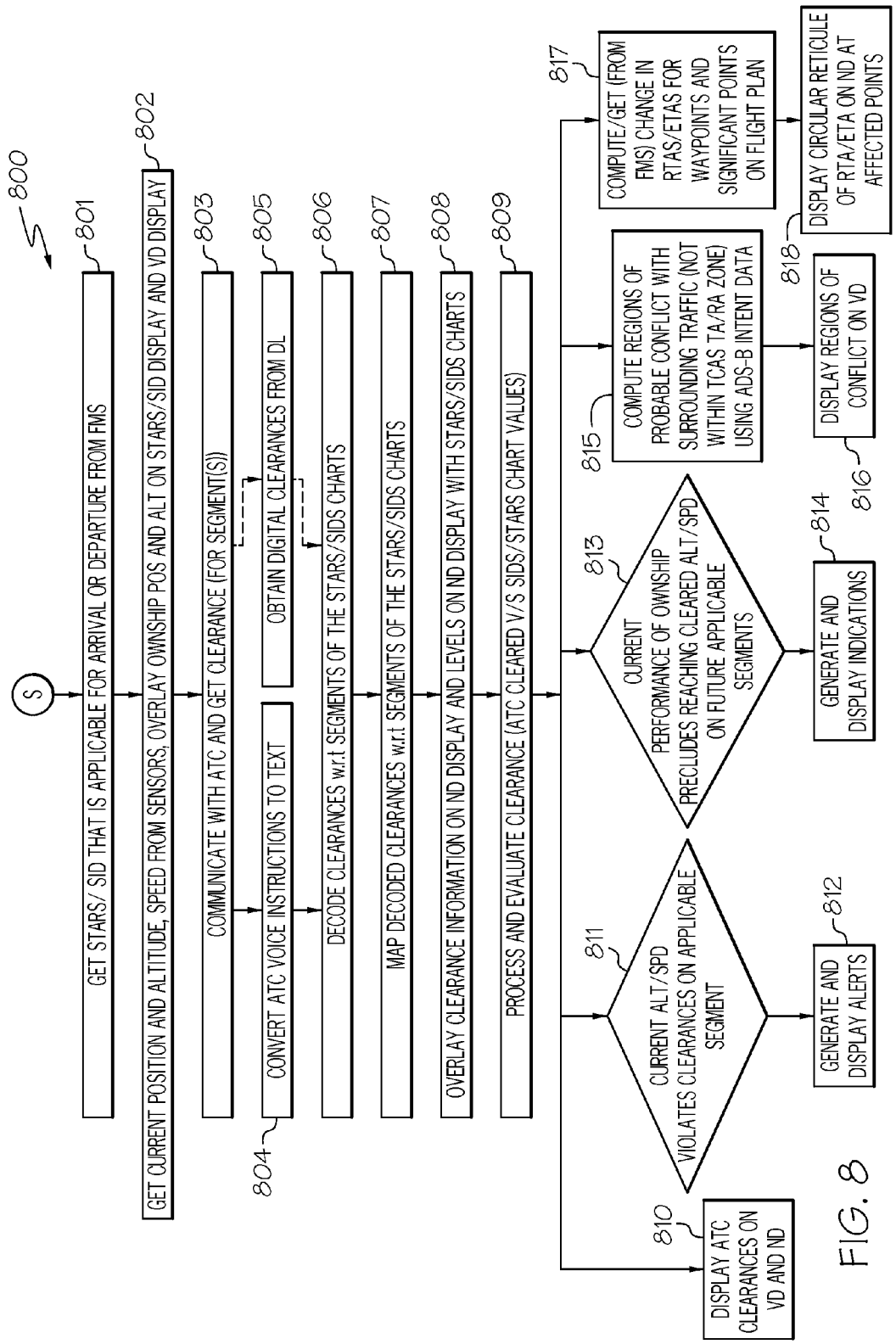

AIRCRAFT DISPLAY SYSTEMS AND METHODS FOR PROVIDING AN AIRCRAFT DISPLAY FOR USE WITH AIRPORT DEPARTURE AND ARRIVAL PROCEDURES

TECHNICAL FIELD

The subject matter described herein relates generally to aircraft display systems and methods for providing aircraft displays, and more particularly, embodiments of the subject matter relate to aircraft display systems and associated methods that provide airport departure and arrival procedures.

BACKGROUND

Instrument procedures (e.g., instrument approach procedures or instrument departure procedures) are used to provide specific detailed instructions for the operation of aircraft in the airport terminal area, and allows air traffic control (ATC) to reduce radio frequency congestion by communicating only the name of the procedure to be flown, rather than having to provide the verbose instructions otherwise required. For example, instrument approach procedures allow a pilot to reliably land an aircraft in situations of reduced visibility or inclement weather by using instruments onboard the aircraft or on the ground, such as radios or other communication systems, navigation systems, localizers, glideslopes, and the like. Published aeronautical charts, such as, for example, Instrument Approach Procedure (IAP) charts, Standard Terminal Arrival (STAR) charts, or Terminal Arrival Area (TAA) charts Standard Instrument Departure (SID) routes, Departure Procedures (DP), terminal procedures, approach plates, and the like, that depict and describe the instrument procedures for various airports, runways, or other landing and/or departure locations are provided by a governmental or regulatory organization, such as, for example, the Federal Aviation Administration in the United States. These charts graphically illustrate and describe the specific procedures (e.g., minimum descent altitudes, minimum runway visual range, final course or heading, relevant radio frequencies, missed approach procedures) to be followed or otherwise utilized by a pilot for a particular approach or departure. A pilot maintains copies of these charts, in either printed or electronic form, for the various possible airports that the pilot may encounter during operation of the aircraft. For example, for worldwide operation, there are as many as 17,000 charts, and each airport may include multiple runways with multiple possible approaches and departures.

During the departure and arrivals phases of the flight, the flight crew of the aircraft is in a high workload situation. In the scenario of flying a STAR approach or a SID departure, level and speed restrictions need to be properly adhered to, especially in traffic-dense airports. Due to various factors such as weather, traffic, and airspace restrictions, among others, ATC sometimes needs to change the level and speed restrictions (i.e., in a manner that differs from the published procedure) of some of the aircraft flying in the airspace under its jurisdiction to suitably handle aircraft traffic in and around the airport. In these circumstances, ATC issues appropriate clearances to change the speed and altitude restrictions to some aircraft that are using these STARS and SIDS. Consequently, the flight crew has to be aware of these changed circumstances and needs to constantly monitor and execute these changed instructions. Additionally, the flight crew needs to be aware of the point when they need to switch to the chart-driven (published) restrictions, if they continue to exist. Further, there have been reported incidents wherein loss of situational awareness ensued and subsequent implications occurred due to non-adherence of such restrictions in an emerging scenario.

Accordingly, it is desirable to provide improved aircraft display systems and methods that assist the flight crew during high workload situations, such as during the execution of airport departure and arrival procedures. Additionally, it is desirable to provide such systems and methods that assist the flight crew in managing and monitoring changes from standard terminal procedures, such as may be requested by air traffic control. Still further, it is desirable to provide such systems and methods that enhance flight crew situational awareness in high traffic areas, such as the terminal area within the vicinity of an airport. Furthermore, other desirable features and characteristics of the present disclosure will become apparent from the subsequent detailed description and the appended claims, taken in conjunction with the accompanying drawings and this background of this disclosure.

BRIEF SUMMARY

Aircraft display systems and methods for providing aircraft displays are disclosed herein. In one exemplary embodiment, a method for generating a flight display in an aircraft includes the steps of receiving an indication of an arrival or a departure procedure for the aircraft to follow, receiving an indication of a current position and altitude of the aircraft, and receiving a voice communication regarding the arrival or departure procedure. The method further includes the steps of recognizing speech in the voice communication and transforming the speech to a restriction regarding the arrival or departure procedure and providing a flight display comprising a visual depiction of the arrival or departure procedure, the current position and altitude of the aircraft, and the restriction regarding the arrival or departure procedure. These depictions are augmented by visual and aural alerts when safety or restrictions have been compromised.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived from the following detailed description taken in conjunction with the accompanying drawings, wherein like reference numerals denote like elements, and wherein:

FIG. 8 provides a flowchart illustrating a method for providing airport departure and arrival procedures using the system shown in FIG. 7;

DETAILED DESCRIPTION

Figure 1:
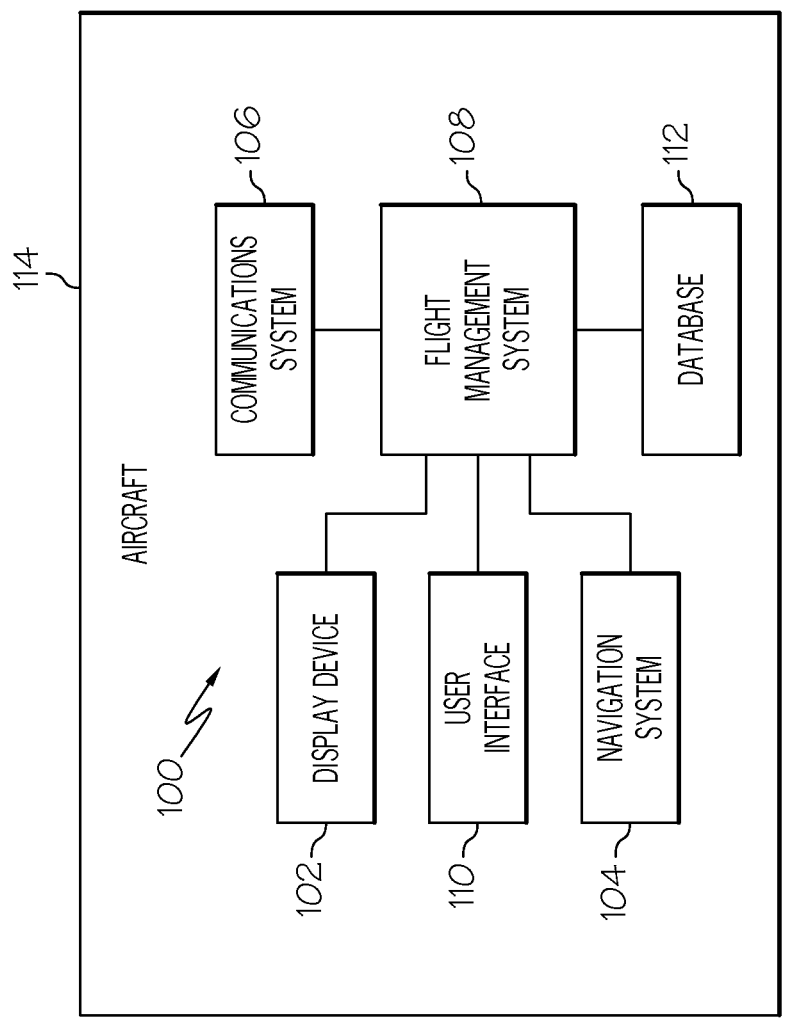
FIG. 1 is a block diagram of a display system suitable for use in an aircraft in accordance with one embodiment.

The following detailed description is merely exemplary in nature and is not intended to limit the invention or the application and uses of the invention. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The embodiments provided in this disclosure relate to aircraft display systems and methods for providing aircraft displays that assist the flight crew and managing and monitoring ATC-initiated changes from published STARS and SIDS, and will be discussed in the context of an exemplary flight display system(s). In some embodiments, the disclosed system may be configured to retrieve the appropriate STAR/SID chart at the initiation of the procedure. The system may then obtain the current aircraft position information and altitude from various aircraft sensors, such as an aircraft global positioning system (GPS) and altimeter, and presents this information to the flight crew in the form of a graphical display along with the retrieved terminal procedure. In some embodiments, the system may then arm a voice-to-text converter that captures the pilot-ATC communication during the terminal procedure and continuously scans for any altitude or speed restriction information in this text. Next, the system may search and consolidate any clearance phrases transacted within the system. In some embodiments, the system may then translate the textual clearance information into a visual indicator on the display system. In order to enhance the flight crew's situational awareness, the system may further receive flight traffic information using Automatic Dependent Surveillance-Broadcast (ADS-B) technology, Traffic and Collision Avoidance System (TCAS) technology, and/or using similar technologies, and compute regions of probable conflict with reference to the clearance information and the traffic. In particular, the system may use ADS-B intent information to predict any possible loss of aircraft separation, including possible conflicts that may occur beyond the traffic advisory zone commonly associated with TCAS systems. Still further, in some embodiments, when ATC clearances cannot be achieved due to constraints on aircraft performance, suitable indications may be provided.

The exemplary aircraft display system outlined above may be embodied in accordance with the display system illustrated in FIG. 1. In particular, FIG. 1 depicts an exemplary embodiment of a display system 100, which may be located onboard an aircraft 114. This embodiment of display system 100 may include, without limitation, a display device 102, a navigation system 104, a communications system 106, and a flight management system 108 (FMS). The display system 100 further includes a user interface 110 for enabling interactivity with the display system 100 and a database 112 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 114 will include numerous other devices and components for providing additional functions and features, as will be appreciated in the art.

In an exemplary embodiment, the display device 102 is coupled to the flight management system 108, and the flight management system 108 is configured to display, render, or otherwise convey one or more graphical representations or images associated with operation of the aircraft 114 on the display device 102, as described in greater detail below. The flight management system 108 is coupled to the navigation system 104 for obtaining real-time data and/or information regarding operation of the aircraft 114 to support operation of the flight management system 108, for example including geographical coordinates, altitude, and airspeed, among others. In an exemplary embodiment, the user interface 110 is coupled to the flight management system 108, and the user interface 110 and the flight management system 108 are configured to allow a user to interact with the display device 102 and other elements of display system 100, as described in greater detail below. The communications system 106 is coupled to the flight management system 108 and configured to support communications between the aircraft 114 and another aircraft or ground location (e.g., air traffic control), as will be appreciated in the art.

In an exemplary embodiment, the display device 102 is realized as an electronic display configured to graphically display flight information or other data associated with operation of the aircraft 114 under control of the flight management system 108, as will be understood. In an exemplary embodiment, the display device 102 is located within a cockpit of the aircraft 114. It will be appreciated that although FIG. 1 shows a single display device 102, in practice, additional display devices may be present onboard the aircraft 114. The user interface 110 may also be located within the cockpit of the aircraft 114 and adapted to allow a user (e.g., pilot, co-pilot, or crew member) to interact with the flight management system 108, as described in greater detail below. In various embodiments, the user interface 110 may be realized as a keypad, touchpad, keyboard, mouse, touchscreen, joystick, microphone, or another suitable device adapted to receive input from a user. In an exemplary embodiment, the user interface 110 and flight management system 108 are cooperatively configured to enable a user to indicate, select, or otherwise manipulate one or more pop-up menus displayed on the display device 102, as described below. It should be appreciated that although FIG. 1 shows the display device 102 and user interface 110 within the aircraft 114, in practice, either or both may be located outside the aircraft 114 (e.g., on the ground as part of an air traffic control center or another command center) and communicatively coupled to the flight management system 108.

In an exemplary embodiment, the navigation system 104 is configured to obtain one or more navigational parameters associated with operation of the aircraft 114. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the current location of the aircraft 114 (e.g., with reference to a standardized geographical coordinate system) and the heading of the aircraft 114 (i.e., the direction the aircraft is traveling in relative to some reference) and providing these navigational parameters to the flight management system 108.

In an exemplary embodiment, the communications system 106 is configured to support communications between the aircraft 114 and another aircraft or ground location (e.g., air traffic control). In this regard, the communications system 106 may be realized using a radio communication system or another suitable data link system. In accordance with one embodiment, the communications system 106 includes at least one radio configured to be tuned for an identified radio communication frequency, as will be appreciated in the art and described in greater detail below.

In an exemplary embodiment, the flight management system 108 (or, alternatively, a flight management computer) is located onboard the aircraft 114. Although FIG. 1 is a simplified representation of display system 100, in practice, the flight management system 108 may be coupled to one or more additional modules or components as necessary to support navigation, flight planning, and other aircraft control functions in a conventional manner. In addition, the flight management system 108 may include or otherwise access a terrain database, navigational database (that includes STAR, SID, and en route procedures, for example), geopolitical database, or other information for rendering a navigational map or other content on the display device 102, as described below. In this regard, the navigational map may be based on one or more sectional charts, topographic maps, digital maps, or any other suitable commercial or military database or map, as will be appreciated in the art.

In an exemplary embodiment, the flight management system 108 accesses or includes a database 112 that contains procedure information for a plurality of airports. As used herein, procedure information should be understood as a set of operating parameters or instructions associated with a particular action (e.g., landing, take off, taxiing) that may be undertaken by the aircraft 114 at a particular airport. In this regard, an airport should be understood as referring to a location suitable for landing (or arrival) and/or takeoff (or departure) of an aircraft, such as, for example, airports, runways, landing strips, and other suitable landing and/or departure locations. The database 112 maintains the association of the procedure information and the corresponding airport. In an exemplary embodiment, the procedure information maintained in the database 112 includes instrument procedure information conventionally displayed on a published chart (or approach plate) for the airport, as will be appreciated in the art. In this regard, the procedure information may comprise instrument approach procedures, standard terminal arrival routes, instrument departure procedures, standard instrument departure routes, obstacle departure procedures, or other suitable instrument procedure information. Although the subject matter is described below in the context of an instrument approach procedure for purposes of explanation, in practice, the subject matter is not intended to be limited to instrument approach procedure and may be implemented for instrument departure procedures and other procedures in a similar manner as described below.

In an exemplary embodiment, an airport has at least one approach having instrument approach procedure information associated therewith. In this regard, each airport (or landing location) may have one or more predefined approaches associated therewith. For example, an airport may comprise a plurality of possible approaches depending on the particular airport runway chosen for landing. In this regard, the database 112 maintains the association of the instrument approach procedure information and the corresponding approach for each airport or landing location. In a similar manner, an airport (or departure location) may have at least one departure route having instrument departure procedure information associated therewith, as will be appreciated in the art. In an exemplary embodiment, the flight management system 108 is suitably configured to utilize the database 112 for rendering instrument approach procedure information for an identified approach (or instrument departure procedure information for an identified departure route), as described in greater detail below.

Figure 2A:
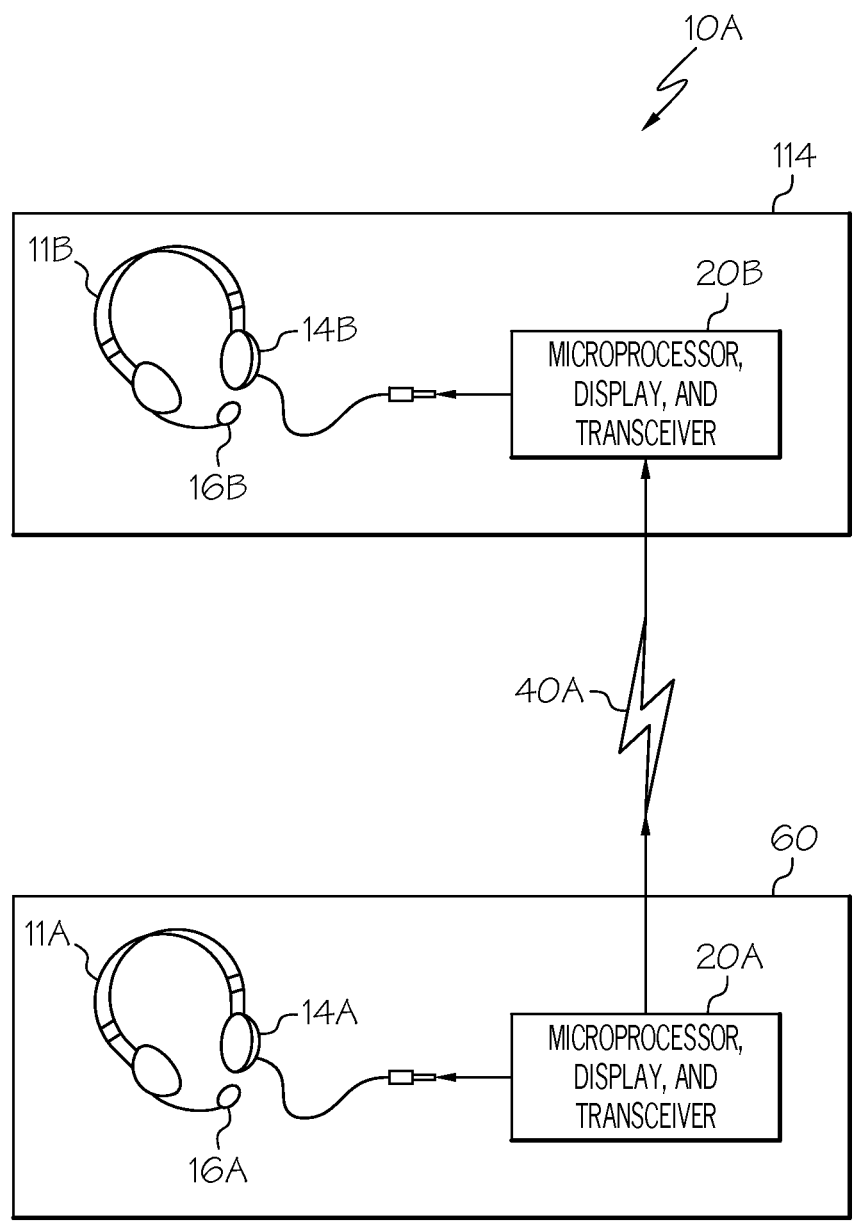
FIG. 2A is a schematic of an uplink communication from an air traffic controller to an aircraft pilot that may form part of the communications system shown in FIG. 1.
Figure 2B:
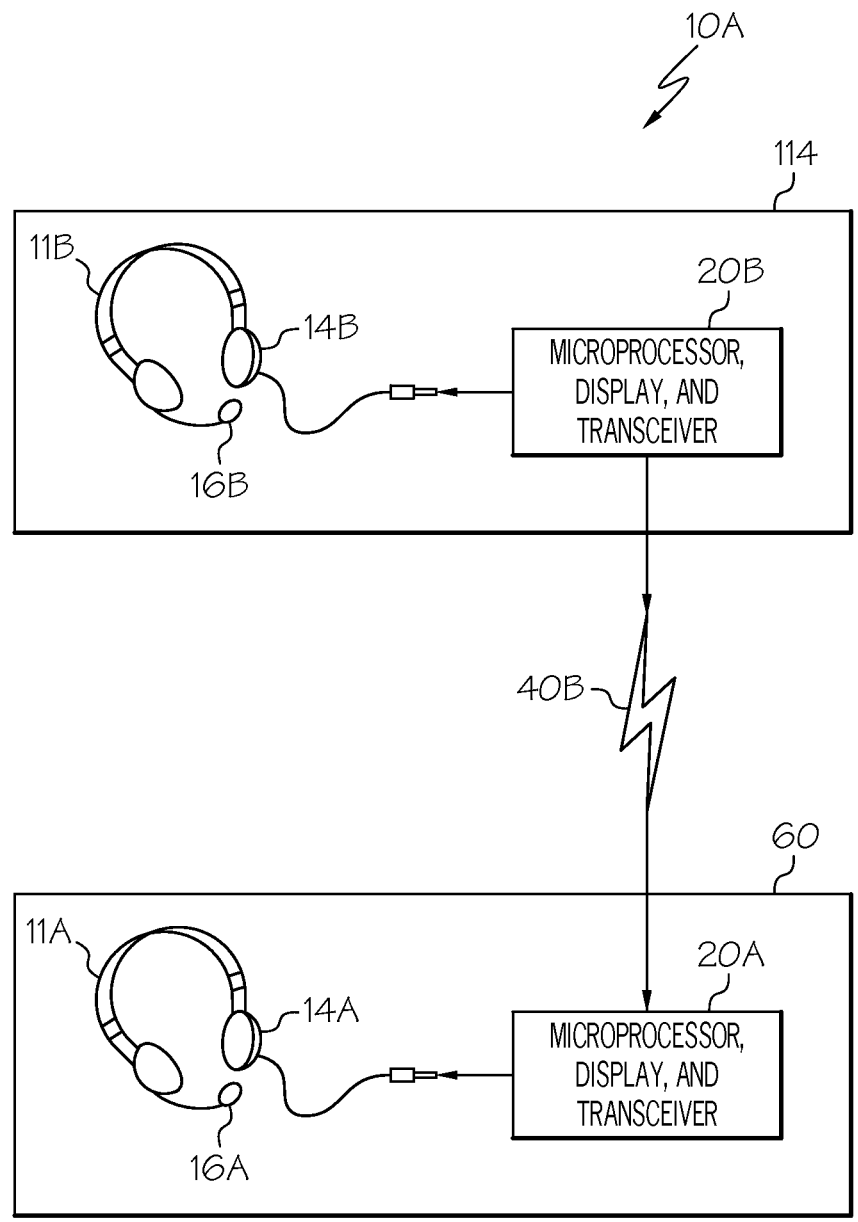
FIG. 2B is a schematic of a downlink communication from an aircraft pilot to an air traffic controller that may also form part of the communications system shown in FIG. 1.
Figure 3:
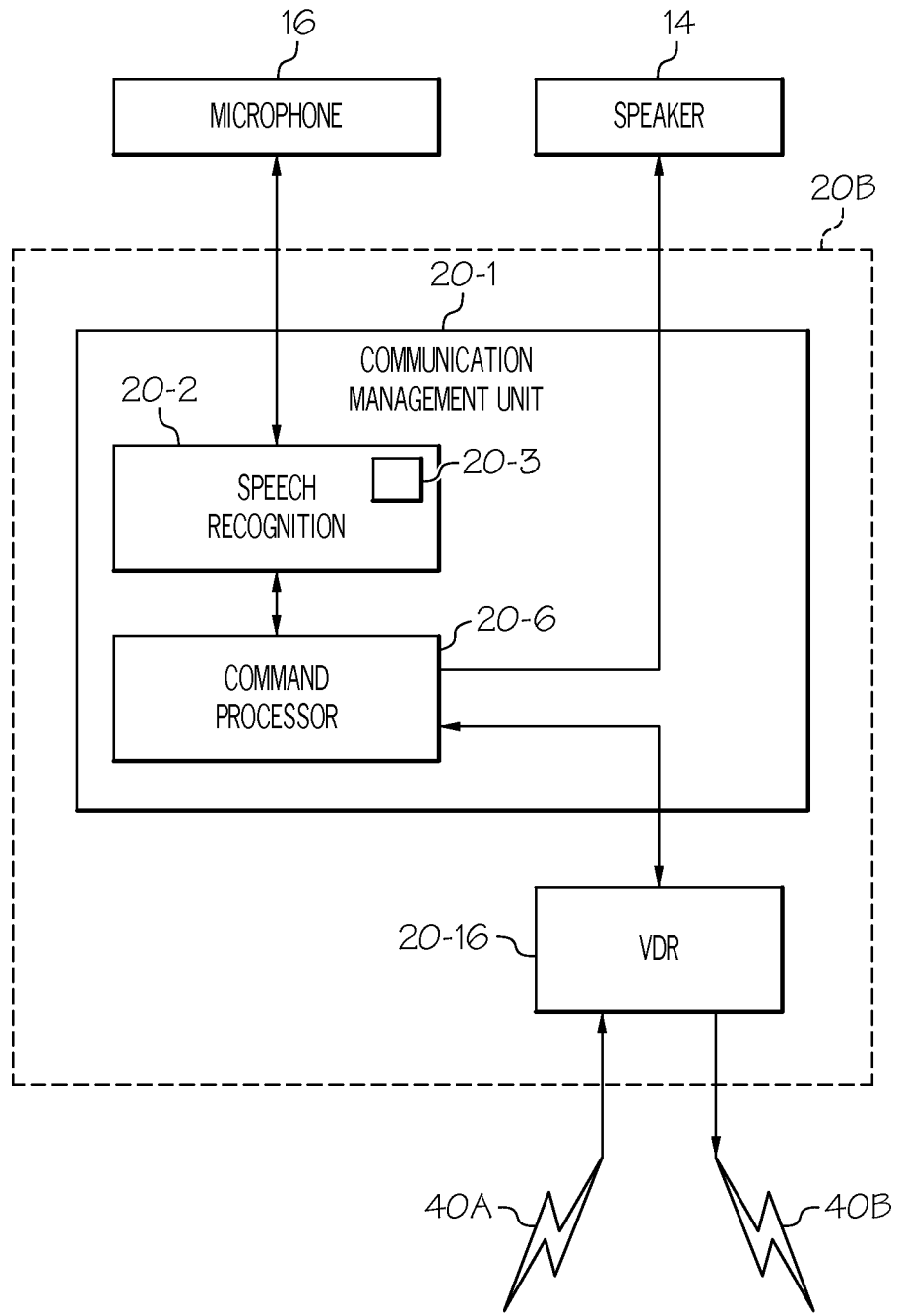
FIG. 3 is schematic diagram of a microprocessor and a transceiver of an aircraft used for transmission of the communications shown in FIGS. 2A and 2B, and which may also form part of the communications system shown in FIG. 1.

FIGS. 2A, 2B, and 3 provide greater detail regarding additional features of the communications system 106 introduced above in the discussion of FIG. 1. FIG. 2A is a schematic of an uplink communication system 10A from an air traffic controller to a pilot of the aircraft 114. The system 10A includes a headset 11B that is worn by the pilot in the aircraft 114 and a headset 11A worn by an air traffic controller in an air traffic control center 60. Each headset 11A and 11B includes at least one speaker 14 and a microphone 16. A controller wearing headset 11A in the air traffic control center 60 speaks into the microphone 16. The microphone 16 and speaker 14 are connected to a microprocessor display and transceiver 20A. The transceiver 20A is in communication with a radio transmission tower 40 that emits an uplink signal 40A to be received by the aircraft 114. In the aircraft 114, a microprocessor display and transceiver 20B receives the uplink signal 40A and presents an audio equivalent through the speaker 14 of the pilot headset 11B. As initially noted above, the communication from the traffic control center 60 to the aircraft 114 may include instructions regarding a STAR or a SID that is currently being executed by the aircraft 114, including but not limited to changes in altitude and speed restrictions regarding the STAR or SID.

FIG. 2B is a schematic of a downlink communication from the pilot to the controller. As shown, the communication system 10B yields a downlink signal 40B from the aircraft 60. The pilot talks into the speaker 16 which is sent to the device 20B. The device 20B transmits and sends out the downlink radio transmission signal 40B the tower 40 which in turn relays the received signal 40B to the device 20A. In some instances, this communication from the pilot to the control center 60 may include an acknowledgement of the instructions regarding the STAR or SID.

FIG. 3 is schematic diagram of microprocessor and transceiver 20B of aircraft 114 used for transmission of downlink signals 40B or reception of uplink signals 40A from and to the center 60. The microphone 16 and speaker 14 are in data communication with a communications management unit (CMU) 20-1, which is a part of communications system 106. The CMU 20-1 is also in signal communication with a very high frequency digital radio (VDR) 20-16 as described below. The CMU 20-1 includes a speech recognition processor 20-2 in signal communication with the microphone 16 and a command processor 20-6 in signal communication with the speech recognition processor 20-2 and in signal communication with the command processor 20-6 and the speaker 14. The command processor 20-6 in turn is in signal communication with the VDR 20-16. The VDR 20-16 generates and transmits a downlink radio signal 40B or receives and conveys an uplink radio signal 40A transmitted by center 60.

The speech recognition processor 20-2 is configured to recognize the speech of either the pilot or the air traffic controller. In this regard, the speech recognition processor 20-2 may include an air traffic control phraseology database 20-3, which includes digital signatures of standard ATC phraseology that the processor 20-2 may be expected to detect during such communications. In a particular embodiment, the speech recognition processor 20-2 is at least configured to recognize the speech of the air traffic controller, and in particular speech regarding speed and altitude restrictions, or other restrictions, in reference to a STAR or SID procedure. For example, during the execution of a STAR or SID procedure, the air traffic controller may issue a speed or altitude restriction to the pilot. This command is transmitted by uplink radio signal 40A. It is then passed to VDR 20-16, command processor 20-6, and speech recognition processor 20-2. It is also passed to speaker 14. Speech recognition processor 20-2 recognizes the restriction, and communications system 106 passes this restriction to the flight management system 108.

Figure 4:
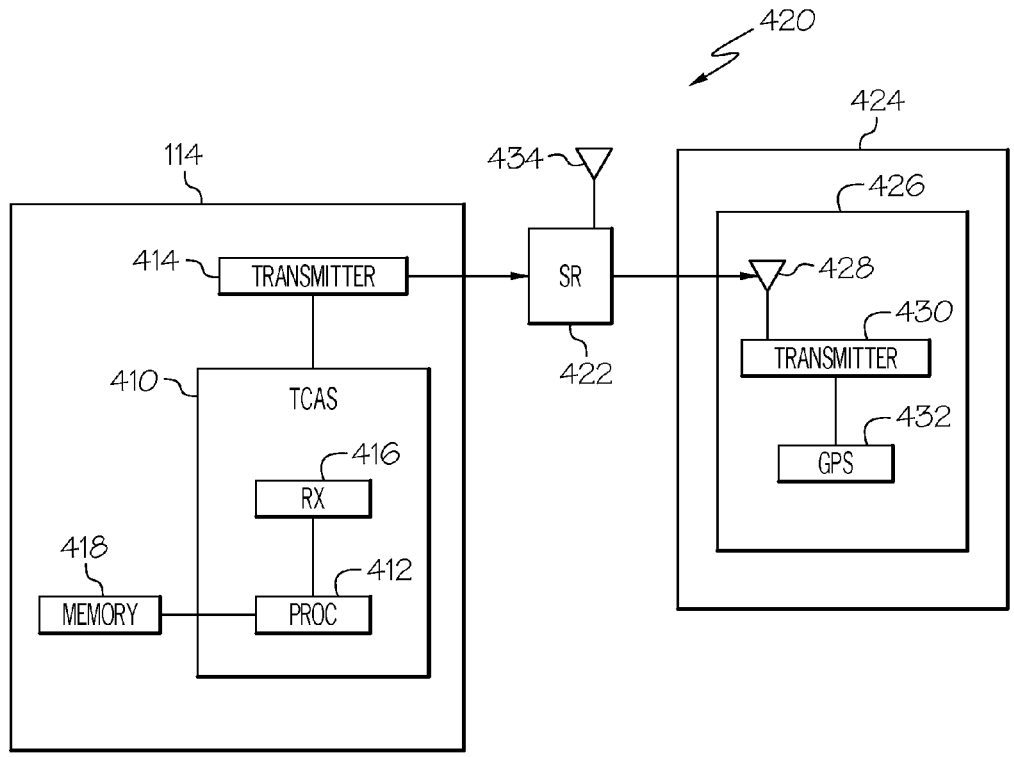
FIG. 4 is a block diagram of a air traffic monitoring system suitable for use in an aircraft in accordance with one embodiment, and provided as part of the navigation system shown in FIG. 1.

FIG. 4 provides greater detail regarding additional features of the navigation system 104 introduced above in the discussion of FIG. 1. FIG. 1 illustrates a schematic view of an example air traffic monitoring system 420. In one embodiment, the system 420 includes a TCAS system 410 aboard the host aircraft 114 that includes a processor 412, a transmitter 414, and a receiver 416. The transmitter 414 generates an interrogation signal based upon surveillance alerts, such as approaching aircraft and threat potentials, produced by a surveillance radar 22. The surveillance radar 422 transmits TCAS transmitter 414 interrogation signals and receives replies at a receiving device 434. A target aircraft 424 includes a surveillance system 426 that receives the interrogation signal at a transmitter receiving device 428 and when interrogated generates a standard transponder reply signal via a transmitter 430. The target aircraft 424 surveillance system 426 may also send an ADS-B reply signal via a navigational component such as a global positioning system (GPS) 432, whenever ADS-B data is available.

ADS-B data provides automatic or autopilot capabilities (i.e., it is always on and requires no operator intervention) and uses accurate position and velocity data from aircraft navigation systems, including latitude and longitude measurements. ADS-B broadcasts aircraft position, altitude, velocity and other data that can be used by air traffic control and other aircraft to share the aircraft's position and altitude without the need for radar.

Whenever the system 420 is not broadcasting, it is listening for Mode-S squitters and reply transmissions at the same frequency used by Mode-S transponders to reply to interrogation signals. Mode-S is a combined secondary surveillance radar and a ground-air-ground data link system which provides aircraft surveillance and communication necessary to support automated air traffic control in dense air traffic environments. Once per second, the Mode-S transponder spontaneously and pseudo-randomly transmits (squits) an unsolicited broadcast. Whenever the Mode-S is not broadcasting, it is monitoring or listening for transmissions. Thus, a TCAS equipped aircraft can see other aircraft carrying a transponder. Once a transponder equipped target has been seen, the target is tracked and a threat potential is determined. Altitude information is essential in determining a target's threat potential. Comparison between the altitude information encoded in the reply transmission from the target aircraft 424 and the host aircraft 114 is made in the processor 412 and the pilot is directed to obtain a safe altitude separation by descending, ascending or maintaining current altitude.

Knowledge of the direction, or bearing, of the target aircraft 424 relative to the host aircraft 114 greatly enhances the pilot's ability to visually acquire the threat aircraft and provides a better spatial perspective of the threat aircraft relative to the host aircraft. The processor 412 can display bearing information if it is available. Bearing information is also used by the processor 412 to determine threat potential presented by an intruder aircraft.

The system 420 determines relative bearing by sending the interrogation signal to the target aircraft 424 and listening for replies that return from the target aircraft 424. The reply from the target aircraft 424 may include a standard transponder reply or an ADS-B signal. The standard transponder reply gives an estimated bearing by measuring the multi-path interference from the target aircraft 424, including phase and amplitude measurements, speed direction, and altitude. The ADS-B signal includes the more accurate bearing measurements of latitude and longitude. When the target aircraft 424 has generated replies to the TCAS 410 interrogation signal, the standard transponder reply or the ADS-B signal is received by the TCAS receiver 416 and stored in a memory device 418 coupled to the processor 412. The memory device 418 collects varying signals and stores them in an internal database for later use by the processor 412 in determining bearing when ADS-B data is unavailable.

Algorithms within the processor 412 use the relationships between estimated bearing based on standard transponder replies versus bearing computed from ADS-B signals to generate a table or other multi-dimensional expression of the database of information stored in the memory 418. Further, the processor 412 corrects values between the standard transponder reply and ADS-B signals to more accurately determine bearing, including averaging the standard transponder reply values and ADS-B values and associating the ADS-B values to previously stored standard transponder reply values.

In some embodiments, the traffic monitoring system 420 may include monitoring systems in addition to TCAS 410 and ADS-B. For example, other known monitoring systems include TIS-B, which is an aviation information service broadcast provided to aircraft using both the 1090 MHz extended squitter (1090 ES) and the universal access transceiver (UAT) band of ADS-B. Accordingly, such additional systems are intended to be included within the scope of the present disclosure.

Figure 5:
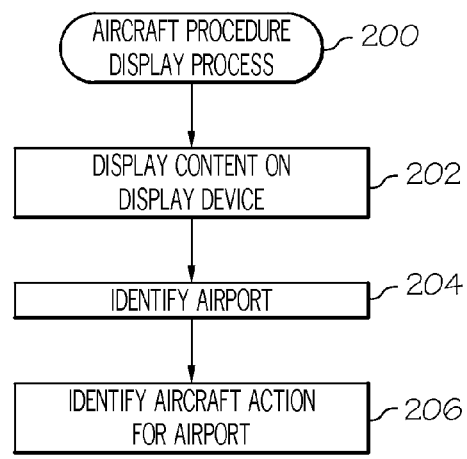
FIG. 5 is a flow diagram of an exemplary aircraft procedure display process suitable for use with the display system of FIG. 1 in accordance with one embodiment.

Referring now to FIG. 5, in an exemplary embodiment, a display system 100 may be configured to perform an aircraft procedure display process 200 and additional tasks, functions, and operations described below. The various tasks may be performed by software, hardware, firmware, or any combination thereof. For illustrative purposes, the following description may refer to elements mentioned above in connection with FIGS. 1-4. In practice, the tasks, functions, and operations may be performed by different elements of the described system, such as the display device 102, the navigation system 104, the communications system 106, the flight management system 108, the user interface 110, or the database 112. It should be appreciated that any number of additional or alternative tasks may be included, and may be incorporated into a more comprehensive procedure or process having additional functionality not described in detail herein.

Referring again to FIG. 5, and with continued reference to FIG. 1, an aircraft procedure display process 200 may be performed to display or present aircraft procedure information (e.g., an instrument approach procedure (STAR) or instrument departure procedure (SID)) for a desired action (e.g., landing or takeoff) at an airport on a display device in order to enable a user, such as a pilot or crew member, to review and/or brief the procedure without reliance on paper charts. It should be appreciated that although the aircraft procedure display process 200 is described in the context of an approach (or instrument approach procedure) for purposes of explanation, the aircraft procedure display process 200 may be implemented for instrument departure procedures and other procedures in a similar manner as described herein.

In an exemplary embodiment, the aircraft procedure display process 200 initializes by displaying content on a display device associated with an aircraft (task 202), such as display device 102. In an exemplary embodiment, and with further reference to FIG. 6, the aircraft procedure display process 200 displays a navigational map 300 (or terrain map) on the display device. For example, the aircraft procedure display process 200 may display and/or render a navigational map 300 associated with a current (or instantaneous) location of an aircraft on a display device in the aircraft. In this regard, the flight management system 108 may be configured to control the rendering of the navigational map 300, which may be graphically displayed on the display device 102. The flight management system may also be configured to render a graphical representation of the aircraft 302 on the map 300, which may be overlaid or rendered on top of a background 304. The background 304 may be a graphical representation of the terrain, topology, or other suitable items or points of interest corresponding to (or within a given distance of) a location of the aircraft 114, which may be maintained by the flight management system 108 in a terrain database, a navigational database, a geopolitical database, or another suitable database. As described in greater detail below, the flight management system 108 may also render a graphical representation of an airport 306 overlying the background 304. It should be appreciated that although the subject matter may be described herein in the context of a navigational map, the subject matter is not intended to be limited to a particular type of content displayed on the display device and the aircraft procedure display process 200 may be implemented with other types of content, such as, for example, an airport map or terminal map.

Figure 6:
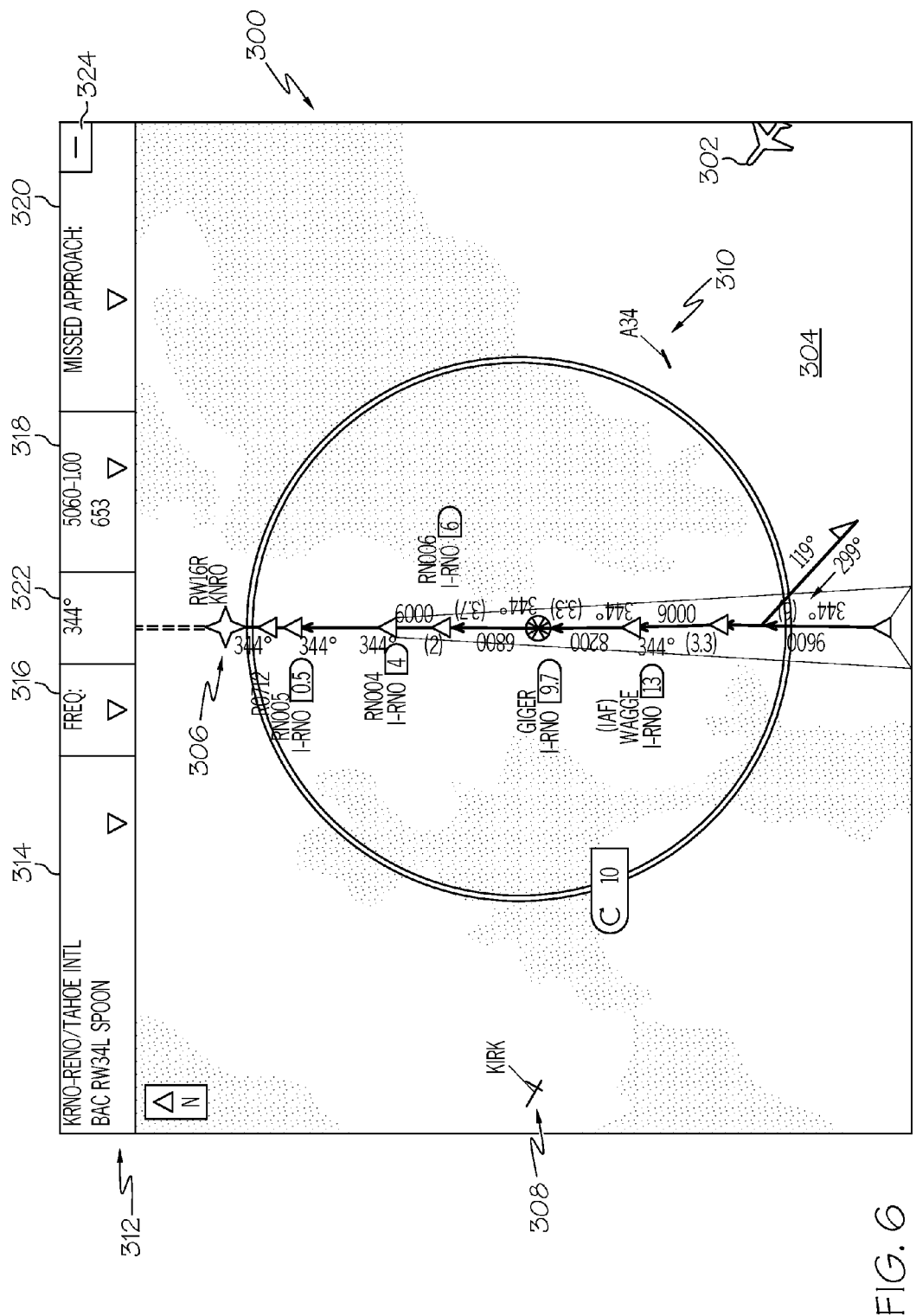
FIG. 6 is a schematic view of an exemplary navigational map suitable for use with the aircraft procedure display process of FIG. 5, showing a briefing panel overlying an upper portion of the navigational map in accordance with one embodiment.

Although FIG. 6 depicts a top view (e.g., from above the aircraft 302) of the navigational map 300, in practice, alternative embodiments may utilize various perspective views, such as side views, three-dimensional views (e.g., a three-dimensional synthetic vision display), angular or skewed views, and the like. Further, depending on the embodiment, the aircraft 302 may be shown as traveling across the map 300, or alternatively, as being located at a fixed position on the map 300, and FIG. 6 is not intended to limit the scope of the subject matter in any way. In an exemplary embodiment, the map 300 is associated with the movement of the aircraft, and the background 304 refreshes or updates as the aircraft travels, such that the graphical representation of the aircraft 302 is positioned over the terrain background 204 in a manner that accurately reflects the current (e.g., instantaneous or substantially real-time) real-world positioning of the aircraft 114 relative to the earth. In accordance with one embodiment, the map 300 is updated or refreshed such that it is centered on and/or aligned with the aircraft 302. Although the navigational map 300 shown in FIG. 6 is oriented north-up (i.e., moving upward on the map 300 corresponds to traveling northward), as described below, in other embodiments, the navigational map 300 may be oriented track-up or heading-up, i.e., aligned such that the aircraft 302 is always traveling in an upward direction and the background 304 adjusted accordingly.

In an exemplary embodiment, the aircraft procedure display process 200 continues by identifying a desired airport (e.g., a landing and/or departure location) for the aircraft (task 204). In this regard, an airport may comprise a runway, a landing strip, an airstrip, another suitable landing and/or departure location, and various combinations thereof having procedure information (e.g., instrument approach procedures or instrument departure procedures) associated therewith. In accordance with one embodiment, the aircraft procedure display process 200 may identify the desired airport using the navigational map 300 displayed on the display device 102. For example, as shown in FIG. 6, the aircraft procedure display process 200 may display a plurality of airports 306, 308, 310 proximate aircraft 114 overlying the background 304 on the navigational map 300, as will be appreciated in the art. The aircraft procedure display process 200 may identify the desired airport in response to a user selecting or indicating an airport displayed on the display device. For example, a user may manipulate the user interface 110 and indicate or otherwise select a first airport 306 (e.g., airport KRNO) displayed on the map 300 as the desired airport (e.g., by positioning a cursor or pointer over airport 306 and clicking or otherwise selecting airport 306). In another embodiment, the aircraft procedure display process 200 may identify the desired airport using a predetermined (or predefined) flight plan. For example, the flight management system 108 may maintain a flight plan that specifies airport 306 as the final entry (or destination) of the flight plan.

In an exemplary embodiment, the aircraft procedure display process 200 continues by identifying a desired aircraft action having associated procedure information for the identified airport (task 206). In this regard, an aircraft action should be understood as referring to an approach (or landing), a departure (or takeoff), taxiing, or another aircraft action having procedure information associated with the particular action. In accordance with one embodiment, the aircraft procedure display process 200 continues by identifying a desired STAR for the identified airport (if the aircraft were on the ground at an airport, it would be a desired SID). As used herein, an approach should be understood as referring to a predefined flight path or other guidance intended to facilitate a safe landing for an aircraft at a particular runway, landing strip, airstrip, or another suitable landing location. If the identified airport has only a single approach associated therewith (e.g., the airport is an airstrip or comprises a single runway), the aircraft procedure display process 200 may identify that approach as the desired approach. In accordance with one embodiment, if the identified aircraft has a plurality of possible approaches (e.g., the airport comprises a plurality of runways), the aircraft procedure display process 200 may identify or otherwise determine a default approach for use as a desired approach for the airport. For example, the aircraft procedure display process 200 may identify the most commonly used approach for the identified airport 306 as the default approach. Alternatively, the aircraft procedure display process 200 may identify the most recently used approach as the desired approach. In another embodiment, the aircraft procedure display process 200 determines and/or identifies the desired approach based on the current heading and/or location of the aircraft 114. For example, the aircraft procedure display process 200 may identify the approach with a final approach course most closely aligned with the current heading of the aircraft 114 as the desired approach.

Figure 7:
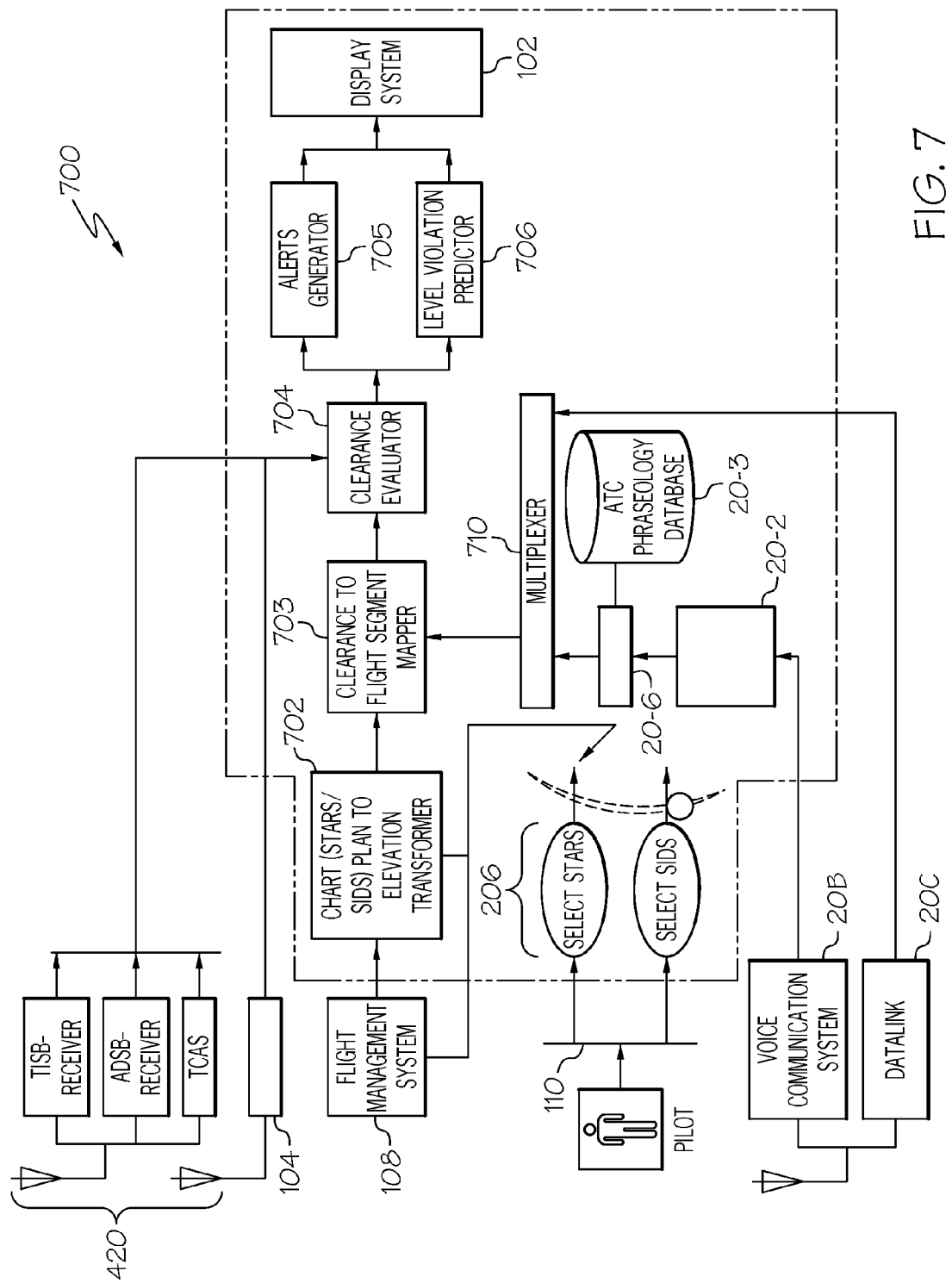
FIG. 7 provides a system diagram implementing a method for providing airport departure and arrival procedures.

Reference is now made to FIGS. 7 and 8, which provide a system diagram and a method flowchart, respectively, setting forth various embodiments of a system 700 and method 800 for providing and displaying airport departure and arrival procedures. FIGS. 7 and 8 illustrate the use and interaction among the various systems and methods described above with regard to FIGS. 1-6 in accordance with these various embodiments. In particular, the embodiments provide a solution to the problem of not having sufficient awareness during execution of the STARS approaches and SID departures by providing systems and methods that first retrieve the appropriate STARS/SID chart when the procedure begins. This process is illustrated as step 801 in FIG. 8, and was described in greater detail above with regard to FIG. 5, and may be performed using the FMS 108 and user interface 110 as shown in FIG. 7, and as was described in greater detail above in FIG. 1. The system 700 then obtains the current position information including altitude from the sensors and then transforms the chart information and presents a "level and speed" awareness information on a navigation display and level awareness information on a vertical display, along with the position of the aircraft 114. This process is illustrated as step 802 in FIG. 8 and block 702 of FIG. 7, and may be performed using navigation system 104 and display device 102, as were described in greater detail above regarding FIG. 1. It is to be noted that this vertical situational information is important in the absence of a vertical Required Navigation Performance (RNP) specification.

Thereafter, the system 700 arms the speech recognition system 20-2 that captures the pilot-ATC communication during the procedure and continuously scans for any altitude or speed restriction information in this text, using the ATC phraseology database 20-3. This process is illustrated in FIG. 8 as steps 803 (communicating) and 804 (converting) and may make use of the communication management unit 20-1, which was described above with regard to FIG. 3, and is a part of the communications system 106. The command processor block 20-6 within the system 700 then searches and consolidates any clearance phrases transacted within the system. This can be performed in accordance with the following exemplary algorithm:

Clearance Information Processing:

---

Get Textual Clearance from Voice to Text Convertor
Use the ATC phraseology Database shown in FIGS. 3 and 7 to perform processing indicated in the steps below:
    Identify Aircraft "CALL SIGN" from the input Text
    Identify "Standard Phraseology Terms" (Eg: "CLEARED", "PROCEED", "VIA",
    "RESUME", "CLIMB", "DIRECT TO") from the input Text
   o Segregate VERBS (Actions, Eg: CLEARED) and ADJECTIVES (Constraints, Eg:
   VIA)
    Identify WAYPOINTS
   o Identify NOUNS (Eg: BATON, KODAP)
    Identify constraints related to FLIGHT LEVEL and SPD Information from the input
   Text
   o Identify ADJECTIVES/PHRASES (Eg: FL 100)
    String together VERBS-ADJECTIVES-NOUNS to form "Linking Tuple"s for
   information processing, and separate the Tuples using VERBs as the Tuple separator.
Thus, construct "Linking Tuple"s of the form :
    o{ACTION -- CONSTRAINT - WAYPOINT}
    o{ACTION -- CONSTRAINT - FLIGHT LEVEL}
Eg: Clearance "PROCEED DIRECT TO BATON THEN CLEARED VIA KODAP ONE
ALFA DEPARTURE CLIMB ON SID TO FLIGHT LEVEL 100"
Linking Tuples:
    {PROCEED -- DIRECT TO - BATON}
    {CLEARED - VIA - KODAP}
    {CLIMB - SID - FL100}
CHART INFORMATION PROCESSING:
    Get Chart Segment and WAYPOINTS Information with Chart Restrictions on FLIGHT
    Levels and SPEED Constraints
    For Every Segment on Chart, record Constraints (Charted Constraints)

CONSTRAINT EVALUATION:
    Evaluate Mapping TUPLEs generated in "Clearance Information Processing" section with every segment produced in "Chart Information Processing" section, overriding any segment information recorded if 'Mapping Tuple' Constraint has overriding characteristics. Use the WAYPOINT (Noun) of each Tuple and cycle through the chart information, applying the constraint associated with each WAYPOINT Determine Extent of Constraint Coverage An optional digital data-link path 20C is also provided should the operations involve usage of this technology. This is also illustrated as step 805 in FIG. 8. The usage of a multiplexer 710 consolidates both the data link 20C and the voice communication paths 20B.

The "Clearance to Flight Segment Mapper" block 703 in FIG. 7 then translates the textual clearance into a visible clearance level after locating the appropriate flight segment(s) on the display system. Note that these clearances may (a) apply to a portion of the chart; (b) remain in effect for the entire procedure; and/or (c) may provide a value different than what is provided in the charts. This is further illustrated at steps 806 through 808 in FIG. 8. Therefore the block 703 builds in a certain level of intelligence to decipher these subtleties. This block 703 therefore takes into account both the chart driven restrictions as well ATC driven restrictions and emphasizes the over-arching ATC directions, as shown with regard to steps 810 through 812 of FIG. 8.

In order to enhance the situational awareness, the system 700 further uses a "Clearance Evaluator" block 704, which receives traffic information from ADS-B, TIS-B, and TCAS systems, as described above with regard to FIG. 4, and computes regions of probable conflict with reference to the cleared levels and the traffic, as further shown in step 809 of FIG. 8. This can be performed in accordance with the following exemplary algorithm:

Clearance Evaluation Processing:

```
For Every Aircraft > X miles from Ownship < Y miles from Ownship
{
    Get Intent Data of A/cs from ADS-B message
    Estimate Position of A/Cs for every half-minute from 5 to 20 minutes
    (30 positions)
    Store Positions in TRAFFIC_DATA
}
For Aircraft 114
{
    Get Intent Data of ownship from FMS
    Estimate Position of A/C for every half-minute from 5 to 20 minutes
    (30 positions)
    Store Positions in OWNSHIP_DATA
}
For Every Entry in TRAFFIC_DATA and OWNSHIP_DATA
{
  Compute Distance between Traffic Entry position and Ownship for
corresponding entries in TRAFFIC_DATA and OWNSHIP_DATA
  If Distance <= Threshold for Safe Separation, Generate REGION
OF CONFLICT INDICATION
}
For Every Entry in TRAFFIC_DATA
{
  Estimate ALT of A/cs
  If ALT Estimated in TRAFFIC_DATA for every A/c is within the
cleared ALT of aircraft 114 (block 706, level violation predictor),
Generate ALERT (block 705, alerts generator)
}
```

This algorithm functions to minimize clutter and show regions where future events may lead to loss of separation on the display. In generating the traffic awareness information, the system uses ADS-B intent information to predict where this loss of separation could possibly happen, as shown using steps 815 and 816 in FIG. 8. This prediction is beyond the traffic advisory zone associated with TCAS systems (i.e., the trajectory sets of aircraft within the vicinity may be used for a more accurate prediction of these regions where loss of separation could occur).

Figure 9A:
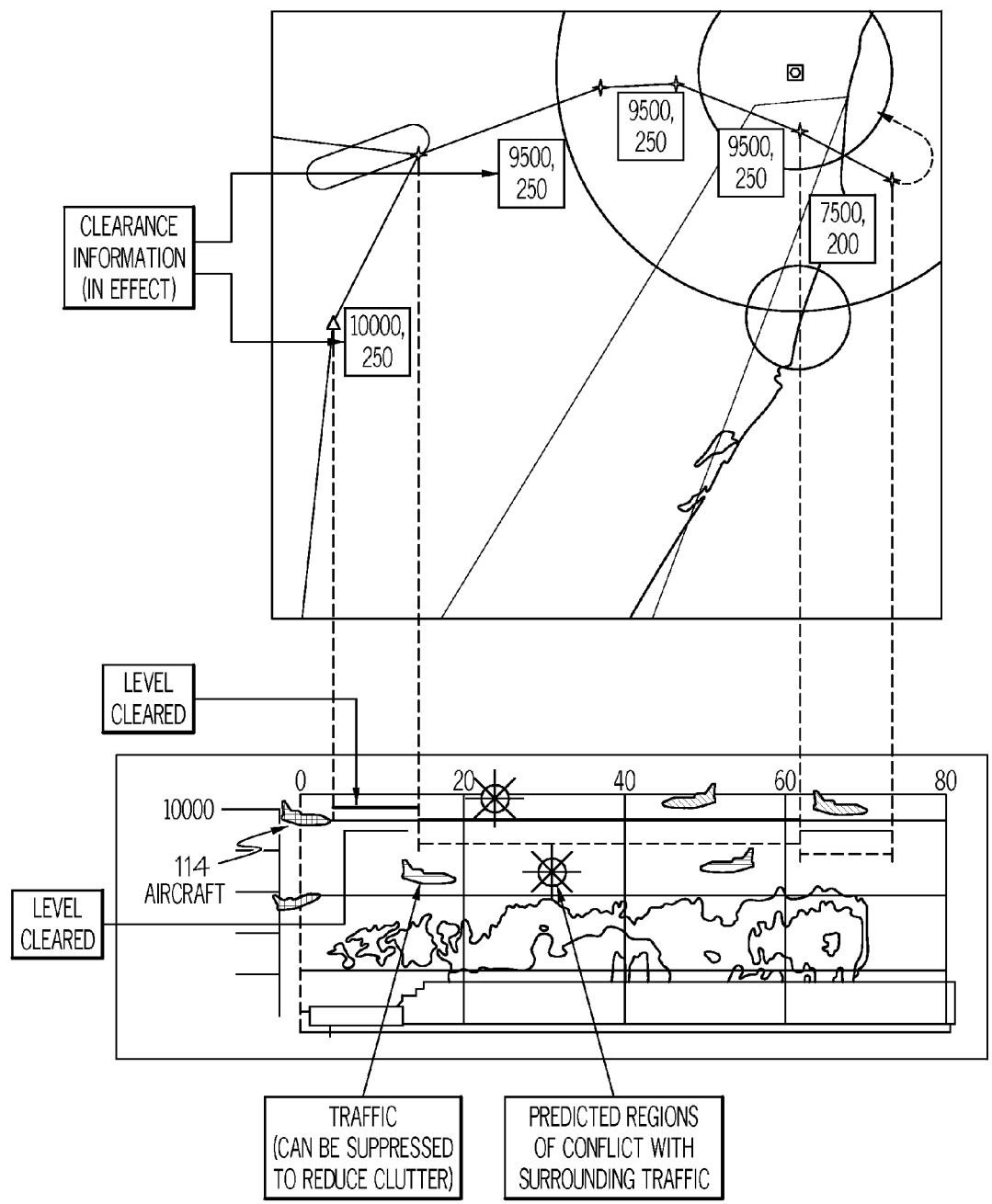
FIGS. 9A-9E illustrate exemplary displays using the systems and methods shown in FIGS. 7 and 8.
Figure 9B:
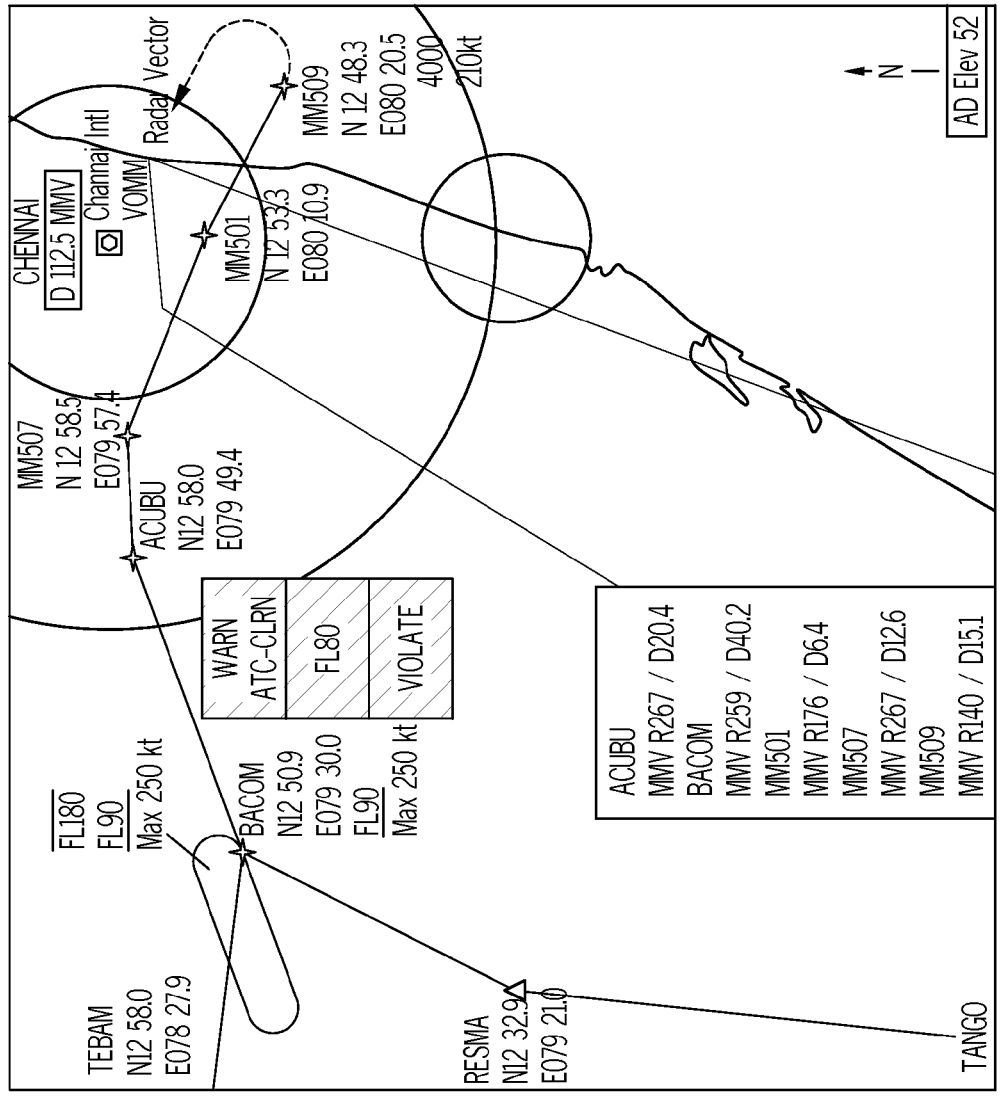
Figure 9C:
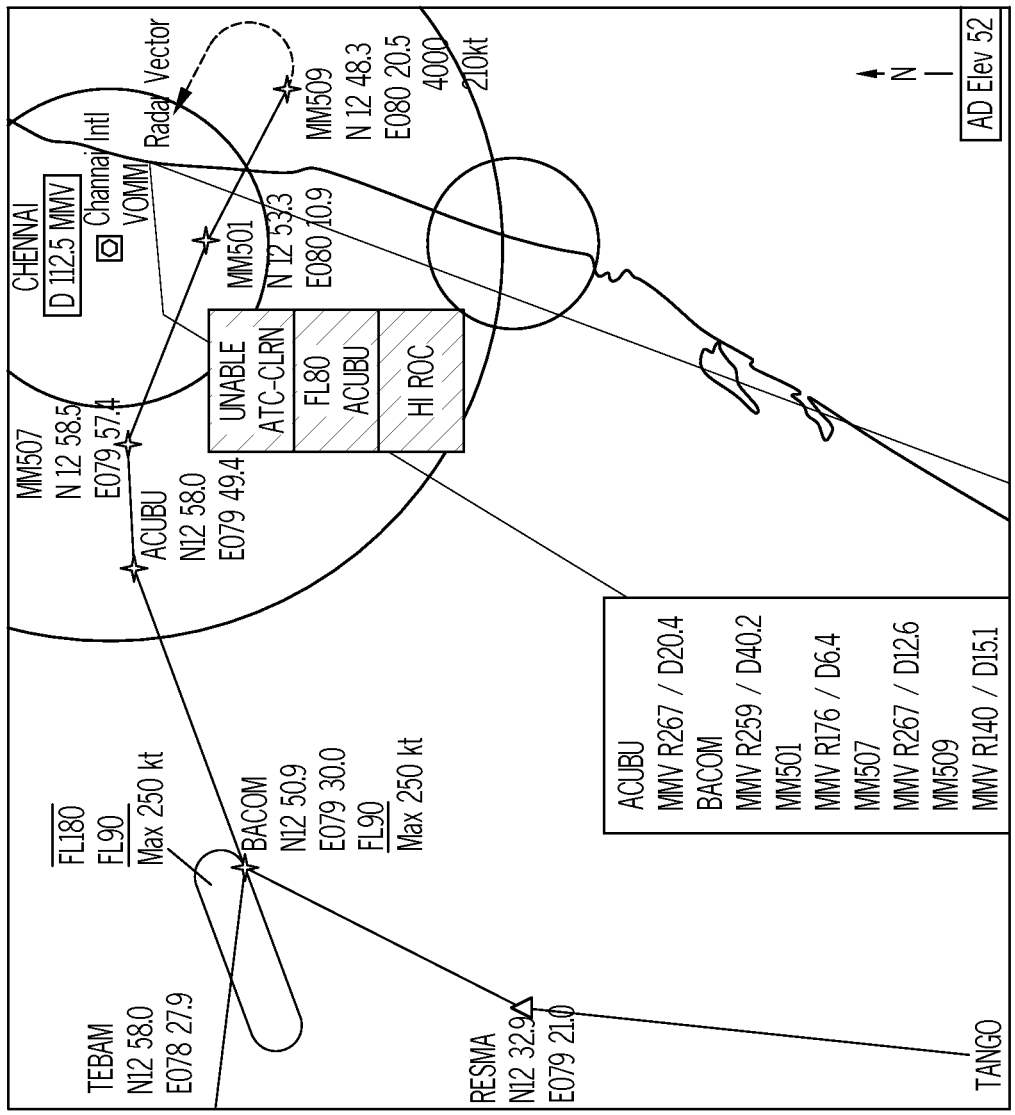
Figure 9D:
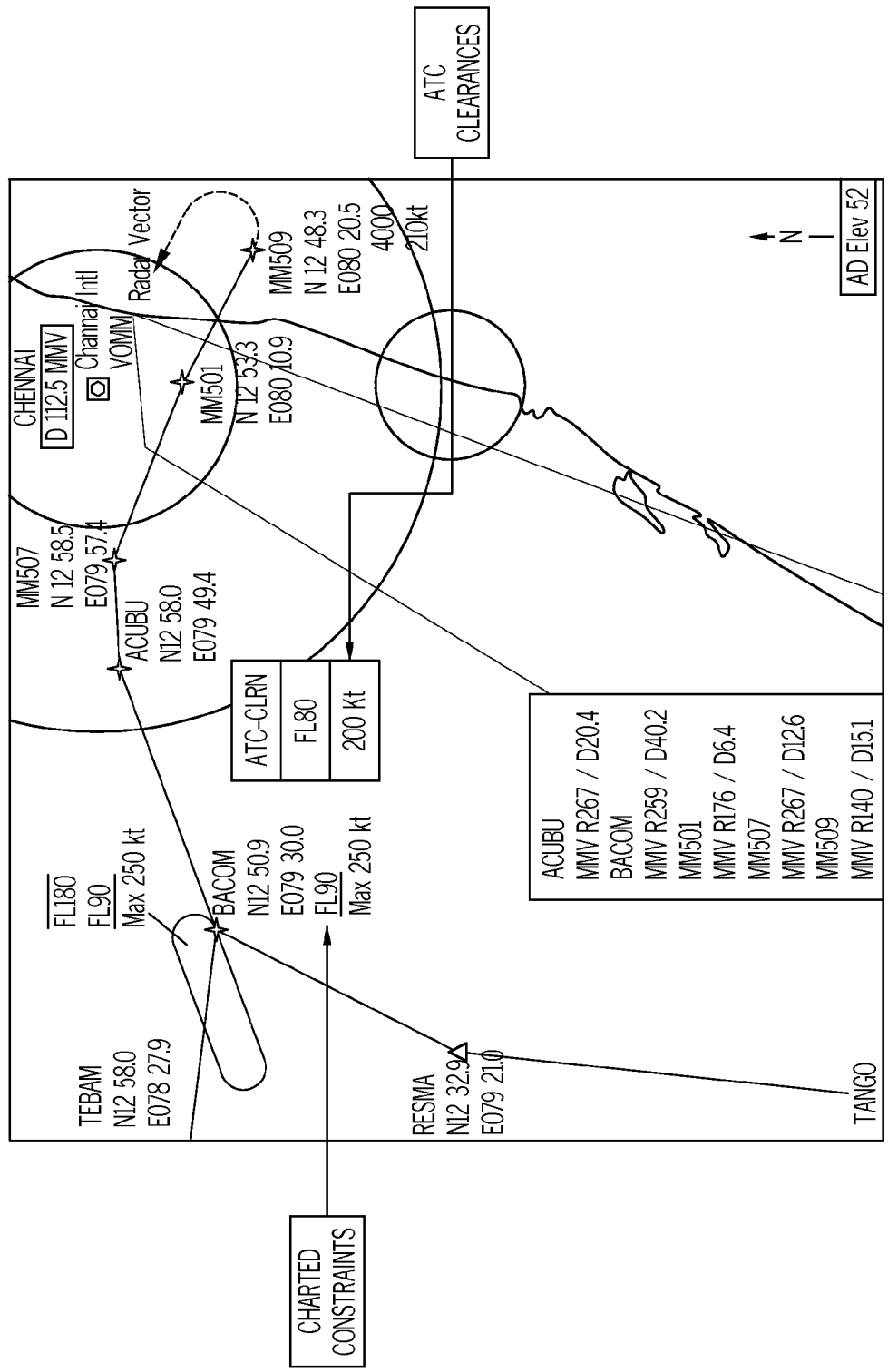

Additionally when ATC clearances cannot be achieved due to constraints on aircraft performance, suitable indications are provided, as shown using steps 813 and 814 in FIG. 8. The following algorithm may be used for this purpose:

Get <Current ATC clearance—SPD and ALT>
    Compute Parameters required to meet <ATC Clearances> (Eg: If Curr ALT is 10000, Cleared ALT is 7000 at a distance of 5 miles, this indicates a ROD of 2500 feet per minute which may be unacceptable)
    If Computed Parameters>Bounds of aircraft 114 Performance Data, Generate INDICATIONS Exemplary displays that may be generated in accordance with the embodiments shown in FIGS. 7 and 8 and provided in FIGS. 9A-9E. FIG. 9A illustrates a display including the a navigational chart (in both vertical and horizontal profiles), the arrival/departure procedure overlaid on the chart, the aircraft 114 position, a restriction issued by ATC regarding the procedure, and air traffic information, including regions of potential conflict (steps 810). FIG. 9B illustrates an exemplary visual display alert if the aircraft flies in such a manner as to violate the ATC-issued restriction (steps 811-812). FIG. 9C illustrates an exemplary visual display alert if the aircraft is unable to meet the ATC-issued restriction, for example due to aircraft performance criteria (steps 813-814). Further, FIG. 9D illustrates an exemplary visual display alert if there are regions of potential conflict with other aircraft, along a flight path flown in accordance with the ATC-issued restriction, as determined by the air traffic information (steps 815-816).

Figure 9E:
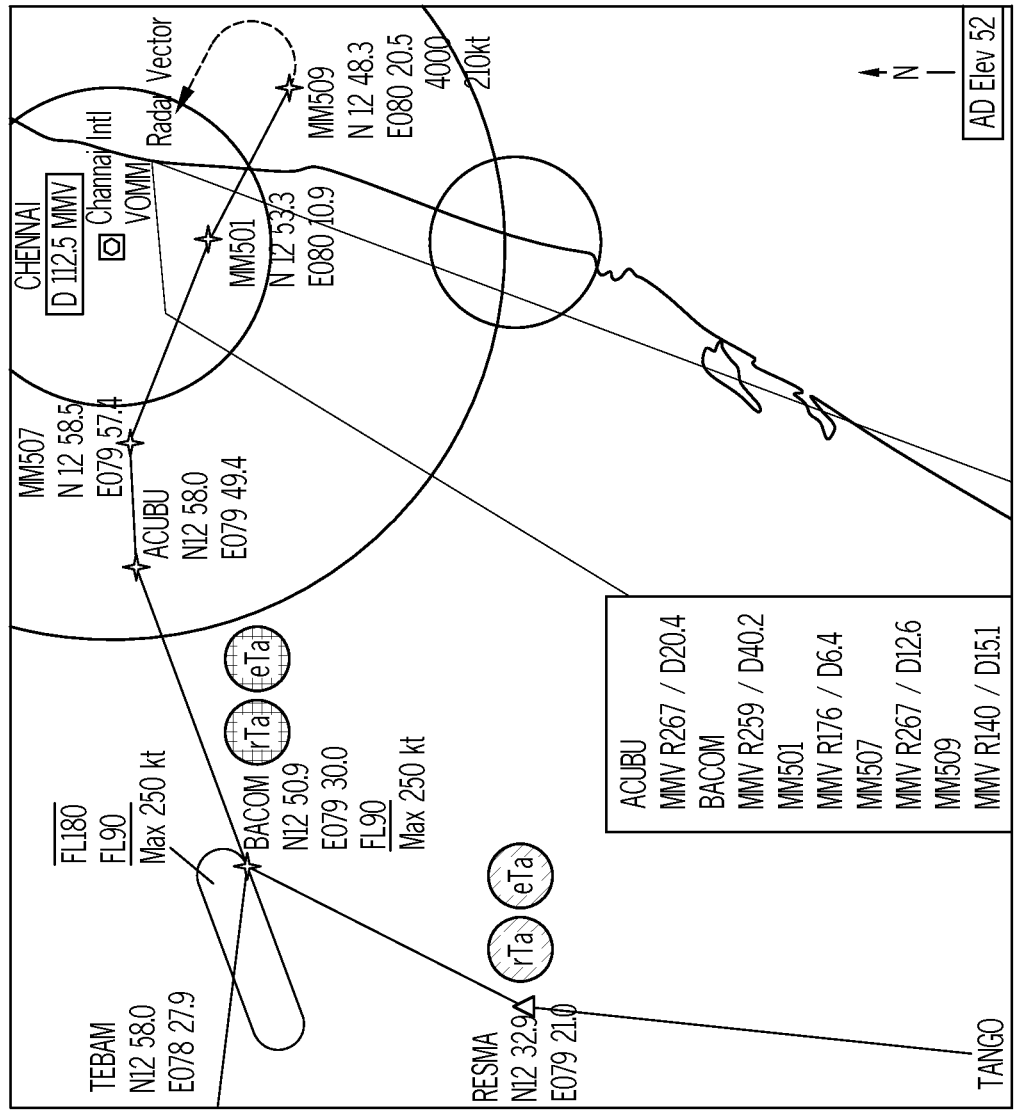

FIG. 8 (steps 817 and 818) address the situation where the ETAs (Expected Time of Arrival) have changed due to the modified restriction and deviates from the corresponding RTAs (Required Time of Arrival)s. FIG. 9E shows how the deviation between the RTAs/ETAs is provided on the displays in an intuitive manner. Circular reticules on the navigation display show the extent of slippage in the times of these parameters. One method of providing this intuitive display is to color code the circular reticule as follows:

Extent of slippage <10%—Reticule Color is GREEN
    Extent of slippage between 11% to 40%—Reticule Color is AMBER
    Extent of slippage between 41% to 70%—Reticule Color is YELLOW
    Extent of slippage >71%—Reticule Color is RED While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for generating a flight display in an aircraft using a flight management system of the aircraft, the method comprising the steps of:
  receiving, at the flight management system, an entry from an aircrew of the aircraft that includes an indication of a published arrival procedure to a specified airport or a published departure procedure from the specified airport for the aircraft to follow, wherein the published arrival procedure comprises a standard terminal arrival route (STAR) procedure or wherein the published departure procedure comprises or a standard instrument departure (SID) procedure, and wherein the published arrival or departure procedure comprises: (1) a plurality of geographically-defined waypoints comprising a navigational route, (2) for each waypoint of the plurality of geographically-defined waypoints, a published altitude restriction, and (3) for each waypoint of the plurality of geographically-defined waypoints, a published speed restriction;
  at the flight management system, automatically receiving an indication of a current geographically-defined position of the aircraft, a current speed of the aircraft, and a current altitude of the aircraft, wherein the indication of the current geographically-defined position and altitude of the aircraft is generated automatically by sensors onboard the aircraft;
  after receiving the entry from the aircrew, receiving at the aircraft an air traffic control (ATC)-initiated voice communication regarding the published arrival or departure procedure, or, receiving an ATC-initiated datalink communication regarding the published arrival or departure procedure, wherein the ATC-initiated voice communication or datalink communication pertains to a deviation of speed or a deviation of altitude from a published speed restriction or a published altitude restriction, respectively, of at least one waypoint of the plurality of geographically-defined waypoints of the published arrival or departure procedure;
  automatically and electronically recognizing speech in the voice communication or automatically and electronically recognizing a clearance from the datalink communication, and transforming the recognized speech or the recognized clearance to an electronic indication of the deviation of altitude or the deviation of speed, and automatically providing the electronic indication of the deviation of altitude or the deviation of speed to the flight management system; and
  automatically at the flight management system, generating a flight display comprising a graphical depiction of the published arrival or departure procedure in both of a horizontal navigation display and a vertical navigation display, wherein the horizontal navigation display comprises: (1) a graphical depiction of at least some of the plurality of geographically-defined waypoints positioned with respect to one another in horizontal navigational space, (2) a graphical depiction, in horizontal navigational space, of the current geographically-defined position of the aircraft in relation to the at least some of the plurality of geographically-defined waypoints, (3) for each waypoint of the at least some of the plurality of geographically-defined waypoints, its published speed and altitude restrictions using a first, numerical symbology, and (4) for the at least one waypoint, the deviation of altitude or the deviation of speed using the first, numerical symbology, and wherein the vertical navigation display comprises: (1) an elevation profile of the at least some of the plurality of geographically-defined waypoints in vertical navigation space, (2) a graphical depiction, in vertical navigation space, of the current altitude of the aircraft, (3) for each waypoint of the at least some of the plurality of geographically defined waypoints, its published altitude restriction using a second, line-based symbology that is different from the first symbology, and (4) for the at least one waypoint, the deviation of altitude, if any, using the second, line-based symbology.

2. The method of claim 1, wherein receiving the ATC-initiated voice communication comprises receiving the ATC-initiated voice communication from an air traffic controller outside of the aircraft.

3. The method of claim 1, wherein automatically and electronically recognizing speech is performed by comparison against an ATC phraseology database comprising a plurality of ATC phrases.

4. The method of claim 1, further comprising, at the flight management system, automatically and electronically receiving air traffic information regarding at least one further aircraft in the vicinity of the aircraft, wherein the air traffic information comprises a position, heading, altitude, and vertical speed of the at least one further aircraft.

5. The method of claim 4, further comprising generating the vertical navigation display so as to further comprise the air traffic information regarding the at least one further aircraft using a third symbology that is different from both the first and second symbologies.

6. The method of claim 5, further comprising determining if the air traffic information regarding the at least one further aircraft indicates an actual or potential separation conflict with regard to the deviation of altitude from the altitude restriction regarding any waypoint of the plurality of geographically-defined waypoints of the published arrival or departure procedure, and generating a visual alert on the vertical navigation display if the air traffic information regarding the at least one further aircraft indicates an actual or potential separation conflict with regard to the deviation of altitude.

7. The method of claim 1, further comprising determining if the aircraft cannot comply with the deviation of speed or altitude from the published speed restriction or the published altitude restriction, respectively, due to an aircraft performance criteria, and generating a visual alert on the horizontal navigation display if the aircraft cannot comply with the deviation of speed or altitude due to the aircraft performance criteria.

8. The method of claim 1, further comprising determining if the current altitude or speed of the aircraft violates the deviation of altitude from the published altitude restriction or the deviation of speed from the published speed restriction, and generating a visual alert on the horizontal navigation display if the current altitude or speed of the aircraft violates the deviation of altitude from the published altitude restriction or the deviation of speed from the published speed restriction.

9. The method of claim 1, further comprising receiving both the voice communication and the datalink communication.

10. The method of claim 1, wherein the ATC-initiated voice communication or the ATC-initiated datalink communication comprise both the deviation of speed and the deviation of altitude from the published speed restriction and the published altitude restriction, respectively.

11. The method of claim 10, wherein the first, numerical symbology comprises a first number and a second number disposed within a graphical box and positioned adjacent to a given waypoint on the horizontal navigational display, wherein the first number comprises an altitude restriction pertaining to the given waypoint and the second number comprises a speed restriction pertaining the given waypoint; and wherein the second, line-based symbology comprises at least two horizontally-oriented lines, situated vertically with respect to one another, wherein the vertical situation of a first of the at least two horizontally-oriented lines is representative of an altitude restriction and wherein the vertical situation of a second of the at least two horizontally-oriented lines is representative of a deviation from an altitude restriction.

12. The method of claim 1, further comprising displaying the generated horizontal navigation display and vertical navigation display on one or more display devices in a flight-deck of the aircraft.

13. A method for generating a flight display in an aircraft using a flight management system of the aircraft, the method comprising the steps of:
receiving, at the flight management system, an entry from an aircrew of the aircraft that includes an indication of a published procedure to or from a specified airport, wherein the published procedure comprises: (1) a plurality of geographically-defined waypoints comprising a navigational route, and (2) for each waypoint of the plurality of geographically-defined waypoints, a published speed restriction;
at the flight management system, automatically receiving an indication of a current geographically-defined position of the aircraft and a current speed of the aircraft, wherein the indication of the current geographically-defined position and speed of the aircraft is generated automatically by sensors onboard the aircraft;
after receiving the entry from the aircrew, receiving at the aircraft an air traffic control (ATC)-initiated communication regarding the published procedure, wherein the ATC-initiated communication pertains to a deviation of speed from a published speed restriction of at least one waypoint of the plurality of geographically-defined waypoints of the published procedure;
at an electronic ATC communications system of the aircraft that is electronically coupled with the flight management system, automatically and electronically recognizing a clearance from the ATC-initiated communication, and transforming the recognized clearance to an electronic indication of the deviation of speed, and automatically providing the electronic indication of the deviation of speed to the flight management system; and
automatically at the flight management system, generating a flight display comprising a graphical depiction of the published procedure in a horizontal navigation display, wherein the horizontal navigation display comprises: (1) a graphical depiction of at least some of the plurality of geographically-defined waypoints positioned with respect to one another in horizontal navigational space, (2) a graphical depiction, in horizontal navigational space, of the current geographically-defined position of the aircraft in relation to the at least some of the plurality of geographically-defined waypoints, (3) for each waypoint of the at least some of the plurality of geographically-defined waypoints, its published speed restriction using a numerical symbology, and (4) for the at least one waypoint, the deviation of speed using the numerical symbology.

14. A method for generating a flight display in an aircraft using a flight management system of the aircraft, the method comprising the steps of:
receiving, at the flight management system, an entry from an aircrew of the aircraft that includes an indication of a published procedure to or from a specified airport, wherein the published procedure comprises: (1) a plurality of geographically-defined waypoints comprising a navigational route, and (2) for each waypoint of the plurality of geographically-defined waypoints, a published altitude restriction;
at the flight management system, automatically receiving an indication of a current geographically-defined position of the aircraft and a current altitude of the aircraft, wherein the indication of the current geographically-defined position and altitude of the aircraft is generated automatically by sensors onboard the aircraft;
after receiving the entry from the aircrew, receiving at the aircraft an air traffic control (ATC)-initiated communication regarding the published procedure, wherein the ATC-initiated communication pertains to a deviation of altitude from a published altitude restriction of at least one waypoint of the plurality of geographically-defined waypoints of the published procedure;
at an electronic ATC communications system of the aircraft that is electronically coupled with the flight management system, automatically and electronically recognizing a clearance from the ATC-initiated communication, and transforming the recognized clearance to an electronic indication of the deviation of altitude, and automatically providing the electronic indication of the deviation of altitude to the flight management system; and
automatically at the flight management system, generating a flight display comprising a graphical depiction of the published procedure in a vertical navigation display, wherein the vertical navigation display comprises: (1) an elevation profile of the at least some of the plurality of geographically-defined waypoints in vertical navigation space, (2) a graphical depiction, in vertical navigation space, of the current altitude of the aircraft, (3) for each waypoint of the at least some of the plurality of geographically defined waypoints, its published altitude restriction using a line-based symbology, and (4) for the at least one waypoint, the deviation of altitude using the line-based symbology.

* * * * *